(12) United States Patent
Slaunwhite et al.

(10) Patent No.: US 6,959,422 B2
(45) Date of Patent: Oct. 25, 2005

(54) SHORTCUT KEY MANAGER AND METHOD FOR MANAGING SHORTCUT KEY ASSIGNMENT

(75) Inventors: Don Slaunwhite, Stittsville (CA); Stephen Mereu, Orleans (CA)

(73) Assignee: Corel Corporation, (CA)

( * ) Notice: Subject to any disclaimer, the term of this patent is extended or adjusted under 35 U.S.C. 154(b) by 587 days.

(21) Appl. No.: 10/039,485

(22) Filed: Nov. 9, 2001

(65) Prior Publication Data

US 2003/0090471 A1 May 15, 2003

(51) Int. Cl.[7] .............................................. G06F 3/00
(52) U.S. Cl. ...................... 715/827; 715/847; 715/767; 715/765; 345/172
(58) Field of Search ................ 345/767, 827, 345/847, 765, 866, 764, 808, 809, 780, 779, 345/704, 802, 846, 172, 168, 156

(56) References Cited

U.S. PATENT DOCUMENTS

| | | | | |
|---|---|---|---|---|
| 5,121,477 A | * | 6/1992 | Koopmans et al. | ..... 345/827 X |
| 5,867,729 A | * | 2/1999 | Swonk | ..................... 345/172 X |
| 6,154,757 A | | 11/2000 | Krause et al. | .............. 707/530 |
| 6,396,480 B1 | * | 5/2002 | Schindler et al. | ....... 345/156 X |
| 2001/0003097 A1 | * | 6/2001 | Jeoung | .................... 345/172 X |
| 2002/0036620 A1 | * | 3/2002 | Tervo | ......................... 345/172 |

FOREIGN PATENT DOCUMENTS

EP 1107544 6/2001 .......... H04M 1/247

OTHER PUBLICATIONS

"Programmable Function Keys", IBM Technical Disclosure Bulletin, vol. 28, No. 6, Nov. 1, 1985, pp. 2725-2726.*
"Automatic Assignment of Mnemonic Characters for Programmable Menus", IBM Technical Disclosure Bulletin, vol. 38, No. 10, Oct. 1, 1995, pp. 27-30.*
Person et al., *Using Word for Windows 95*, Indianapolis, IN: Que Corporation, 1995.

* cited by examiner

*Primary Examiner*—Raymond J. Bayerl
(74) *Attorney, Agent, or Firm*—Hayes Soloway P.C.

(57) ABSTRACT

A shortcut key manager and method is provided for managing shortcut key assignment to non-command user interface items. In response to receipt of an item identification that identifies a non-command user interface item type and a key identification that identifies a shortcut key, the shortcut key is assigned to the non-command user interface item type that defines the non-command item. When the shortcut key is input, an instance of the non-command user interface item is presented to the user in response to the user input of the shortcut key.

18 Claims, 5 Drawing Sheets

SHORTCUT KEY MANAGER AND METHOD FOR MANAGING SHORTCUT KEY ASSIGNMENT

This invention relates to customization of a user interface of an application, and more particularly, to shortcut key assignment to user interface items.

BACKGROUND OF THE INVENTION

There exist applications that allows users to customize user interfaces. As one way of customizing a user interface, traditionally special combinations of keystrokes have been assigned to frequently-used commands. When a special combination of keystrokes is pressed, its corresponding command is fired to the application and the command is executed. Those special combinations of key strokes are often called "shortcut keys". Typically, shortcut keys combine the Ctrl or Alt keys with some other keys.

A typical application presents command buttons to users in toolbars and menus. Command buttons allow users to select desired commands using a mouse or keyboard.

Any command button can have shortcut key assignment for the command that it represents. For example, a command for opening a new file is presented in a toolbar as a command button "File-New", i.e., a "New" button is provided in a "File" menu. A user can set shortcut key Ctrl-N assignment to the new file opening command. This shortcut key assignment allows an alternative way to fire the new file opening command, rather than selecting the command button "File-New" from the toolbar or menu. When the user presses the shortcut key Ctrl-N, the shortcut key controller fires the new file opening command to the application which will create a new document. None of the "File-New" buttons are selected by the user, and the command is sent independently of any instance of the button in the user interface.

In addition to command buttons, applications typically provide other user interface items that do not have a command to fire. For example, a drop down listbox like a font selection list on a toolbar does not fire a command when it is selected; it simply lists a set of choices. An edit box as well does not fire a command, but allows the user to enter a value in the edit box. Also, popup menu items do not fire a command when selected, but show the submenu associated with them. These items which do not have a command to fire may be collectively called as "non-command user interface items" or simply "non-command items".

There are a number of solutions that have been tried to deal with shortcut key assignments to these non-command user interface items. For example, some existing applications do not allow shortcut key assignments for non-command items. This is an inadequate solution since it reduces the customization potential of the user interface.

Some existing applications locate an instance of a non-command item on one of the visible toolbars and set the keyboard focus to it. This requires the user to look around the screen to find to which item the focus has been set. Once the focus has been set to the item, the user can then make use of it. This solution will not work if there is no instance of the non-command item on any of the visible toolbars.

Furthermore, some existing applications allow shortcut key assignments to the non-command items by bringing up a dialog that contains the item when the short cut key assignment is pressed. For example, if a shortcut key is set to a font drop down listbox item which changes the font typeface, pressing the shortcut key launches a font dialog which contains several font settings, one of them including a method to change the font typeface. This requires a full functioning dialog which can change the same setting that the item changes. It also slows the users down since they have to find where to change the setting in the dialog and then exit from the dialog.

Some applications use a combination of the above solutions. That is, if there is an instance of the non-command user interface item on one of the visible toolbars then focus is set to that item. If there isn't one visible, then the a settings modal dialog is brought up from which the setting can be changed. These applications still suffers from the same drawbacks described above.

It is therefore desirable to provide a mechanism that allows users to easily access non-command user interface items.

SUMMARY OF THE INVENTION

It is an object of the invention to provide a novel system and method for managing shortcut key assignment for non-command user interface items that obviates or mitigates at least one of the disadvantages of existing systems.

The present invention links a shortcut key to the type of a non-command user interface item.

In accordance with an aspect of the present invention, there is provided a shortcut key manager for managing shortcut key assignments. The shortcut key manager comprises an item receiver for receiving an item identification that identifies a non-command user interface item type; a key receiver for receiving a key identification that identifies a shortcut key; an assignment handler for assigning the shortcut key to the non-command user interface item type; and a shortcut key handler for presenting an instance of the non-command user interface item to a user when the user uses the shortcut key.

In accordance with another aspect of the invention, there is provided a method for managing shortcut key assignment. The method comprises steps of receiving an item identification that identifies a non-command user interface item type; receiving a key identification that identifies a shortcut key; and assigning the shortcut key to the non-command user interface item type.

In accordance with another aspect of the invention, there is provided a computer readable memory for storing the instructions and/or statements for use in the execution in a computer of a method for managing shortcut key assignment. The method comprises steps of receiving an item identification that identifies a non-command user interface item type; receiving a key identification that identifies a shortcut key; and assigning the shortcut key to the non-command user interface item type.

In accordance with another aspect of the invention, there is provided electronic signals for use in the execution in a computer of a method for managing shortcut key assignment. The method comprises steps of receiving an item identification that identifies a non-command user interface item type; receiving a key identification that identifies a shortcut key; and assigning the shortcut key to the non-command user interface item type.

In accordance with another aspect of the invention, there is provided a computer program product for use in the execution in a computer of a method for managing shortcut key assignment. The computer program product comprises a module for receiving an item identification that identifies a non-command user interface item type; a module for receiving a key identification that identifies a shortcut key; and a module for assigning the shortcut key to the non-command user interface item type.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
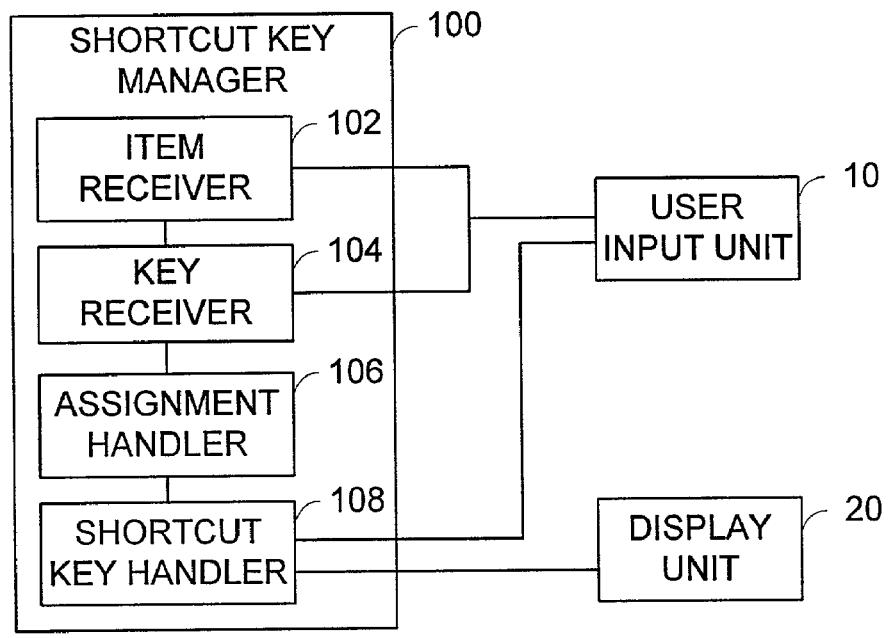
FIG. 1 is a diagram showing a shortcut key manager in accordance with an embodiment of the present invention.

Referring to FIG. 1, a shortcut key manager in accordance with an embodiment of the present invention is described. The shortcut key manager 100 is used with a user input unit 10 and a display unit 20. The user input unit 10 typically includes a keyboard and a mouse.

The shortcut key manager 100 comprises an item receiver 102, a key receiver 104, an assignment handler 106 and a shortcut key handler 108. The item receiver 102 receives from the user input unit 10 an item identification that identifies a non-command user interface item.

An "item type" refers to the kind of item (button, drop down listbox, slider, etc.) as well as what function the item serves in the application. For example, the "zoom level drop down listbox" item type identifies that an instance of this type is a drop down listbox that is used to change the zoom level view of the document. The "nib size slider" item type identifies that an instance of this type is a slider control that is used to modify the paint brush nib size. The "File-New button" item type identifies that an instance of this type is a toolbar button that is used to send the "File-New" command to the application. The item type is a definition of an item and does not represent an actual instance of an item but uniquely defines a type of an item.

A user interface item is an instance of an item type that is visually represented on the user interface. The user can use the item to perform a specific task.

A command is a request that is sent to the application to be fulfilled. For example, the "File-New" command causes the application to create a new document. The "File-Print" command causes the application to print the document. These are specific requests that are sent to the application to fulfill. Although the application may delegate the responsibility to another component, like the active document, the initial request is sent to the application. Item types that have a command associated with them are hereafter referred to as "command item types". A user interface item instance of command item types are hereafter referred to a command user interface item.

Changing a setting, like the current font typeface or size, is not considered a command since the request is not sent to the application but is handled by the individual font control. It is just changing an internal setting; there is no specific request sent to the application. Item types that do not have a command associated with them are hereafter referred to as "non-command item types". A user interface item instance of a non-command item type is hereafter referred to as a non-command user interface item.

A command user interface item is an instance of a command item type. It has one command associated with it and when the item is selected, the command is sent to the application to be fulfilled. Examples of command items are toolbar buttons and menu items.

A non-command user interface item is an instance of a non-command item type. It does not send a command to the application when selected. Instead it is simply a control that can be used to modify an application setting or popup a submenu. Some examples of non-command items are drop down list boxes, slider controls, edit boxes, colour selection pickers, popup menu items, etc.

In an application there can be several item instances of the same item type. For example, the "File-New" button may appear on more than one toolbar. In this case, each button is an new instance of the item type for "File-New". It may also be that an item type does not have any specific instances in the user interface. If the user customizes the interface and adds an item of this item type, then there would be one instance of that item type.

When defining a shortcut key assignment, the item receiver 102 receives the item type from the user input unit 10. The key receiver 104 then receives from the user input unit 10 an identification of a shortcut key to which the item type is to be assigned. A shortcut key may comprise one or more keystrokes. The shortcut key identification may be the name of the desired keystrokes or any identification that can identify the shortcut key.

The assignment handler 106 assigns the shortcut key given to the key receiver 104 to the item type that was given to the item receiver 102. It links the shortcut key with the item type, not with any particular instance of the item type. This is the same method for both command and non-command item types. Typically it is done in a customization dialog where the user selects the item type from a list of available item types and then keys in the shortcut key that is associated with it.

When the user presses a shortcut key, the user input unit 10 sends the key sequence to the shortcut key handler 108. This handler 108 uses the assignment handler 106 to determine which item type was assigned to the given shortcut key. If the item type is for a command item, then the shortcut key handler 108 simply sends the command to the application to fulfill the request. If the shortcut key was linked to an item type that was a non-command item, then the shortcut key handler 108 presents a new instance of the non-command item to the user through the display unit 20.

Figure 2:
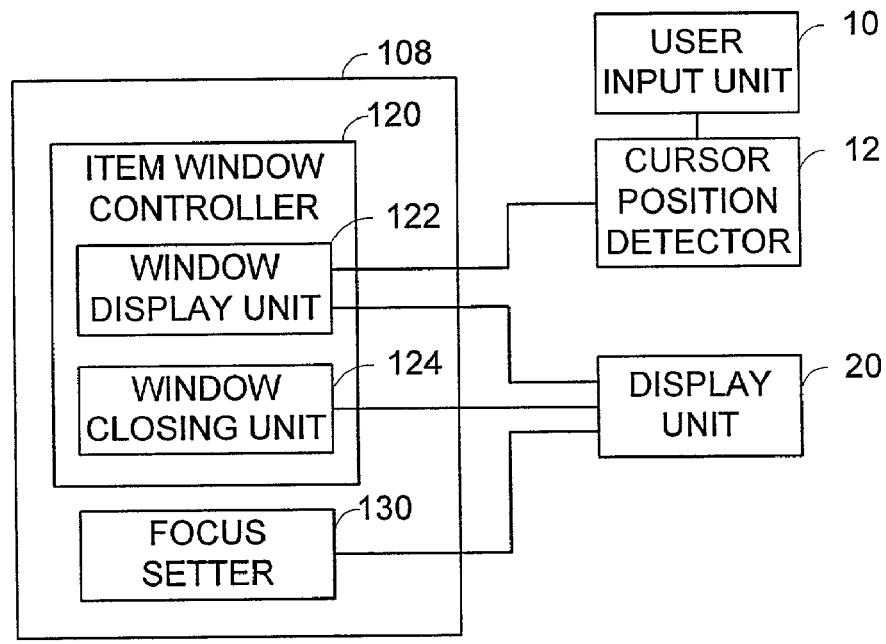
FIG. 2 is a diagram showing an example of the shortcut key handler shown in FIG. 1.

FIG. 2 shows an example of the shortcut key handler 108. In this example, the shortcut key handler 108 has an item window controller 120 and a focus setter 130. The item window controller 120 has a window display unit 122 and a window closing unit 124. The window display unit 122 displays a popup window containing a new instance of a non-command item when its corresponding shortcut key is input through the user input unit 10. The popup window is typically a small window such that it can contain the non-command item therein, but it does not contain a full dialog relating to the item. The window display unit 122 may display the popup window at the cursor location. The cursor location data may be obtained from a cursor position detector 12 of the user input unit 10.

The focus setter 130 then sets the keyboard focus on the non-command item when it is displayed. The setting of the keyboard focus may be achieved by using a Window's function that allows setting of the keyboard focus on any window. The setting the focus on the non-command item allows users to manipulate the item promptly and easily without looking for the desired item in a large dialog or elsewhere in the interface like on a toolbar. It is desirable that the focus setter 120 sets the keyboard focus on the non-command item. The keyboard focus setting allows users to continue to use the keyboard to modify the value of the non-command item or select an option.

The window closing unit 124 controls closure of the popup window. It closes the popup window when the user performs one or predetermined actions, such as pressing "Enter" to assign a value to the non-command item, pressing "Esc" or clicking off the popup window.

Figure 3:
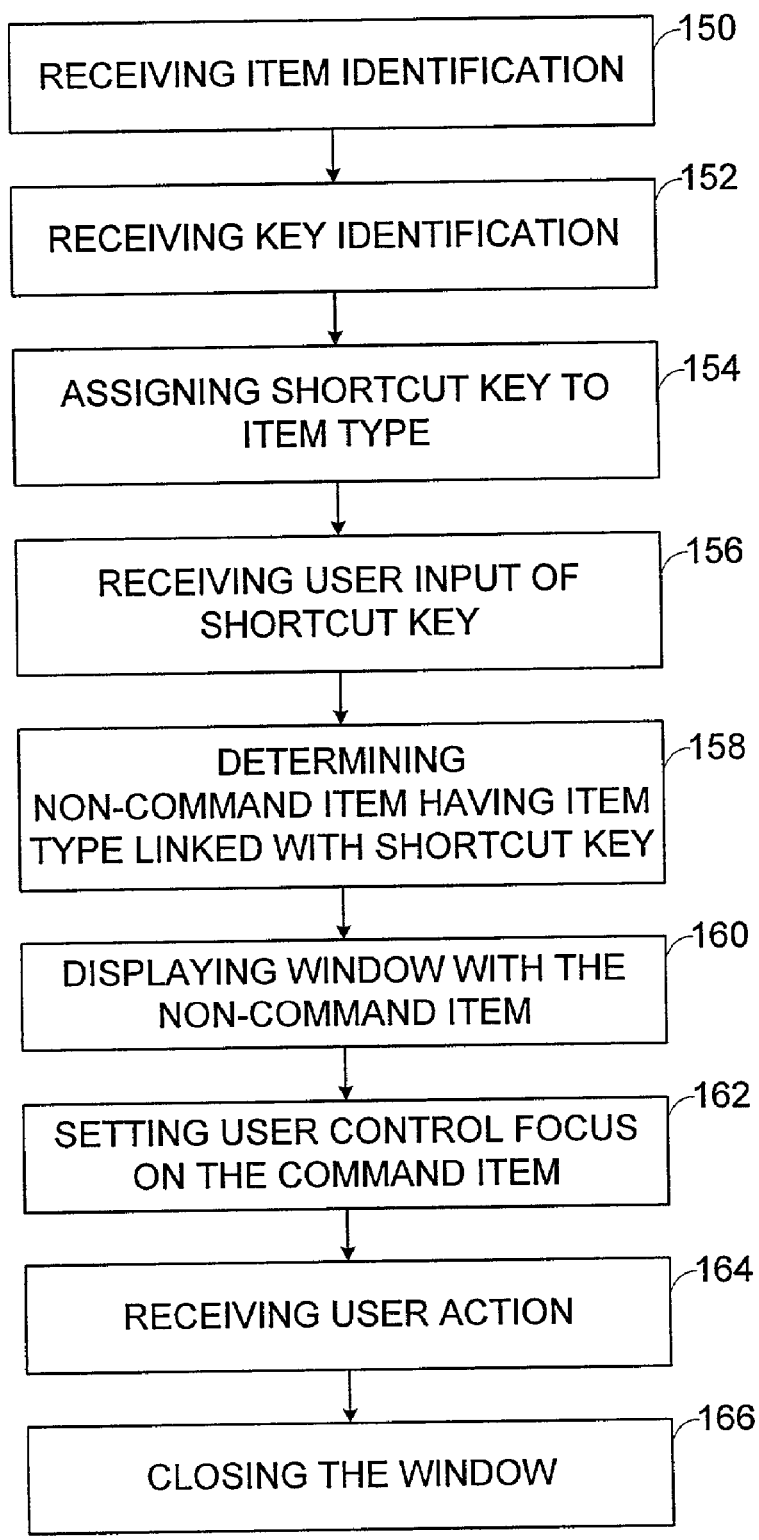
FIG. 3 is a flowchart showing an example of the operation of the shortcut key manager shown in FIG. 1.

FIG. 3 shows an example of the operation of the shortcut key manager 100 in accordance with an embodiment of the invention.

When a user intends to create new shortcut key assignment, the user specifies an item type and a desired shortcut key. The shortcut key manager 100 receives the identification of the specified item type (150) and the identification of the shortcut key (152). The order of receiving these identifications may be varied.

In response to the receipt of the identifications, the shortcut key manager 100 assigns the shortcut key to the item type (154).

When the user inputs a shortcut key, the shortcut key manager 100 receives the shortcut key input (156). In response to the shortcut key input, the shortcut key manager 100 determines the item type that is linked with the input shortcut key, and determines if it is a non-command item type (158). If it is a non-command item type, it instantiates a new instance of the non-command user interface item with this type and presents it to the user, typically by displaying a popup window with the new instance of the non-command item (160).

It is preferable that the shortcut key manager 100 sets the user control focus, e.g., keyboard control, on the non-command item (162) in order to facilitate easy manipulation of the non-command item by the user. It is also preferable that the popup window is placed at the cursor location determined by the cursor position detector 12.

When the user performs a predetermined action such as setting a value of the non-command item, pressing "Esc" or clicking off the window, the shortcut key manager 100 closes the popup window of the non-command item (166).

By allowing shortcut key assignment to non-command items using the item types, users have more flexibility to customize their user interfaces, compared to those existing applications which allow the shortcut key assignment to command items only. This flexibility benefits professional users. The use of shortcut keys also benefits visually impaired users.

Figure 4:
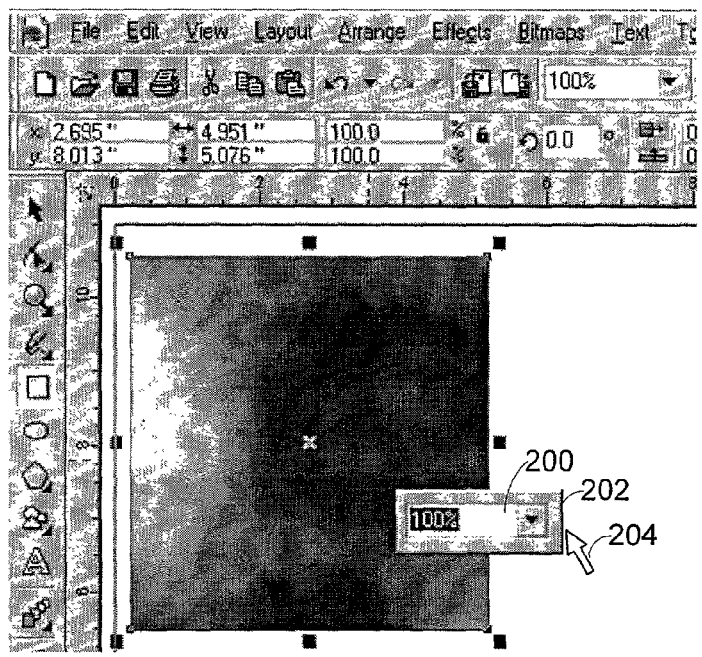
FIG. 4 is a partial screen shot showing an example of a popup window having a drop down listbox.
Figure 5:
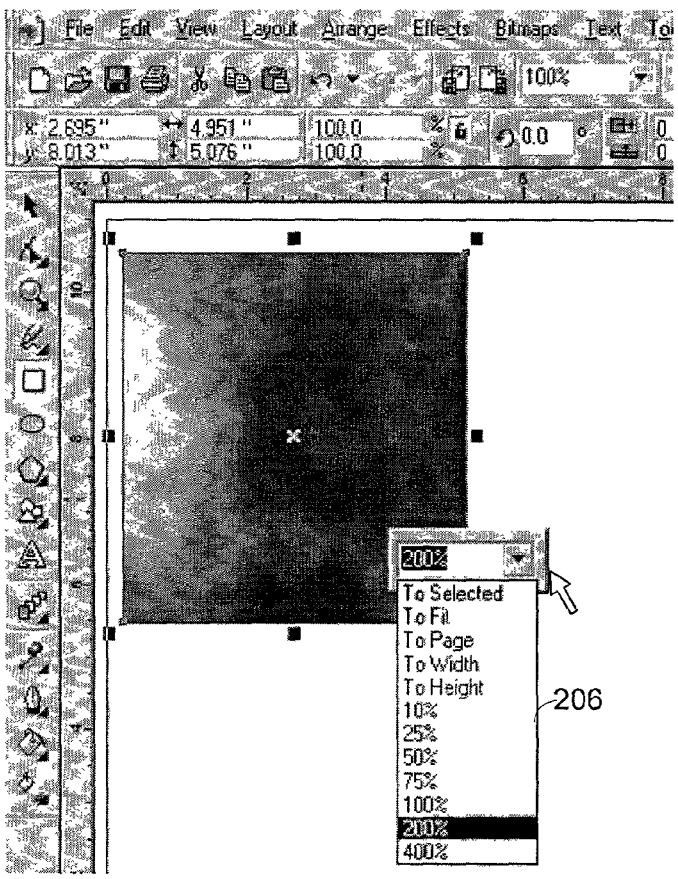
FIG. 5 is a partial screen shot showing a pull-down menu of the drop down listbox shown in FIG. 4.

An example of the shortcut key assignment in accordance with the present invention is described now referring to FIGS. 4 and 5.

In the example shown in FIG. 4, a shortcut key Alt-Z has been assigned to the "zoom drop down listbox" item type. This assignment links the shortcut key Alt-Z with the item type and not with any instance of the zoom drop down listbox on existing toolbars/menus. It is achieved by storing the relationship between the shortcut key and the item type. When a shortcut key is pressed, this relationship is referenced to determine which item type was assigned to that key. If it is a command item type, the command is sent to the application which is the standard shortcut key behaviour. If it is a non-command item type, in accordance with this embodiment of the present invention, it will popup a window with an instance of the non-command item in the window.

In this example, when the shortcut key Alt-Z is pressed by the user, a popup window 202 appears at or adjacent of the location of the cursor 204 with a new instance of the zoom drop down listbox 200 in the window 202. The keyboard focus is set on the zoom drop down listbox 200 as shown with the highlighted value in the drop down listbox 200. Since the keyboard focus is set to the zoom drop down listbox 200 in the new popup window 202, the user can continue to use the keyboard. As shown in FIG. 5, by pressing a down arrow key or other preselected key in the keyboard, a pull-down window 206 with a list of zoom levels is displayed. By using the down arrow key or other preselected key to select a desired zoom level and pressing "Enter", the user can quickly modify the current zoom level with the keyboard without using the mouse. When the user presses 'Enter' to assign the value, 'Esc' or clicks off the popup window 202, the window 202 is closed and disappears.

Another example of non-command items is a popup menu/flyout item, i.e., an item in a submenu of the popup menu. The conventional way to access its submenu is to select it on a menu/toolbar with the mouse or keyboard through the menu/toolbar hierarchy.

An embodiment of the present invention allows shortcut key assignment to any popup menu/flyout item, even to those that are not visible when the popup menu is closed. When the shortcut key is pressed, the submenu is displayed at the cursor location with the focus set to the menu so the user can continue keyboarding through it.

Figure 6:
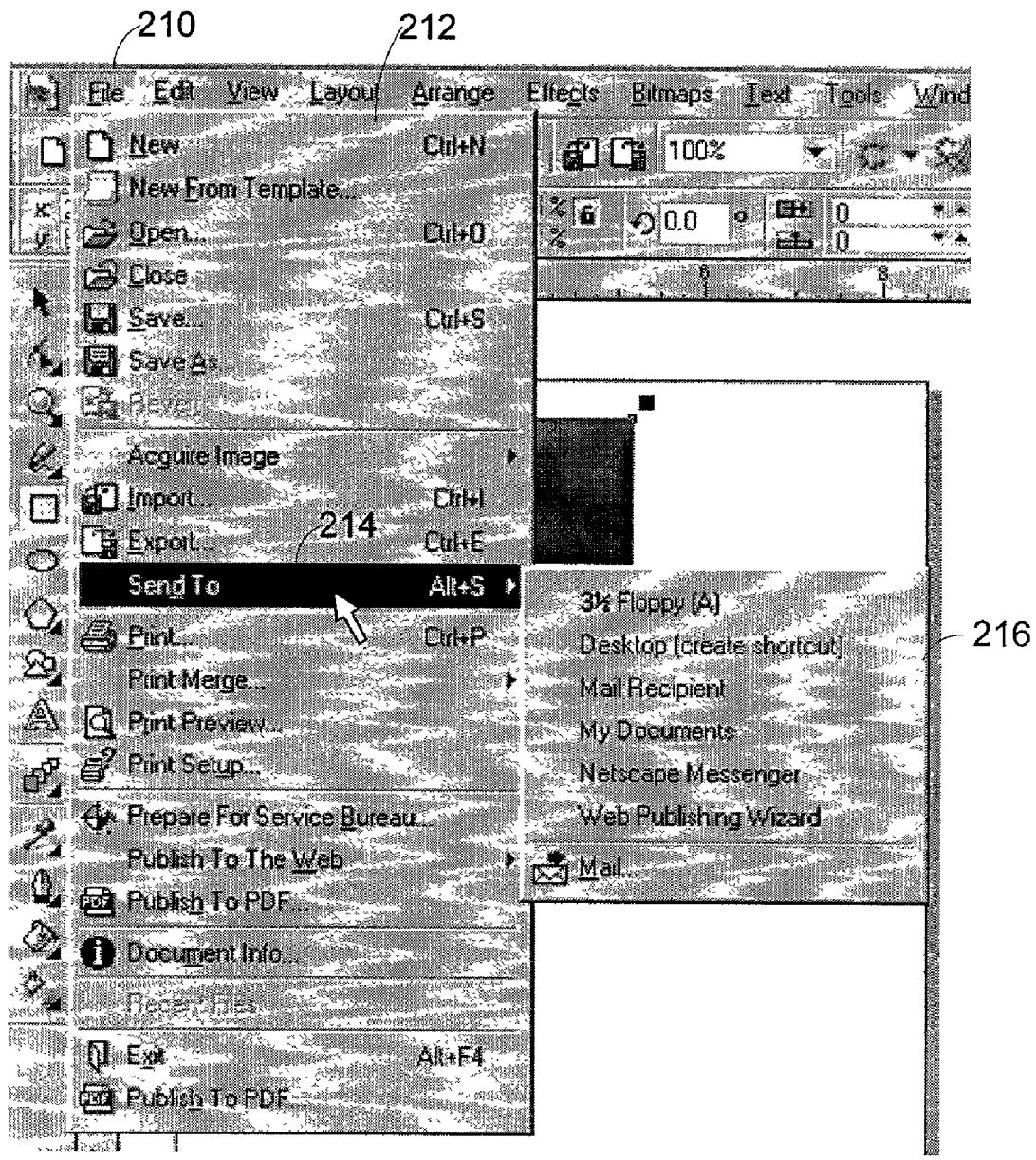
FIG. 6 is a partial screen shot showing an example of selection of "Send To" menu item.

For example, FIG. 6 shows an example of a popup menu 212 to access its "Send To" submenu 216 that lists available destinations for sending a document. Conventionally, there are two ways to access this submenu 216. One is to use the mouse and the other way is to use the keyboard. To access the submenu 216 using the mouse, the user clicks on the "File" button 210 to open the "File" menu 212, and then selects the "Send To" item 214. To access the submenu 216 through the keyboard, the user opens the "File" menu 212 with a menu accelerator Alt-F, and then opens the "Send To" submenu 216 with a menu accelerator 'd' key. The accelerator key applies only if the menu item is visible and the submenu that is launched will appear attached to the selected popup menu item. These accelerator keys are similar to shortcut keys in that they are keyboard requests but differ in that they are directly linked to a visual user interface item whereas shortcut keys are not. When the "Alt" key is pressed, all the visible menu items will have one of their letters underlined. This indicates that the application is now in an accelerator key mode and the next key that is pressed will be checked against those that are visually available. Shortcut keys are different since they are not linked with a visual user interface item and are always available, not just when the application is placed in a particular mode.

Figure 7:
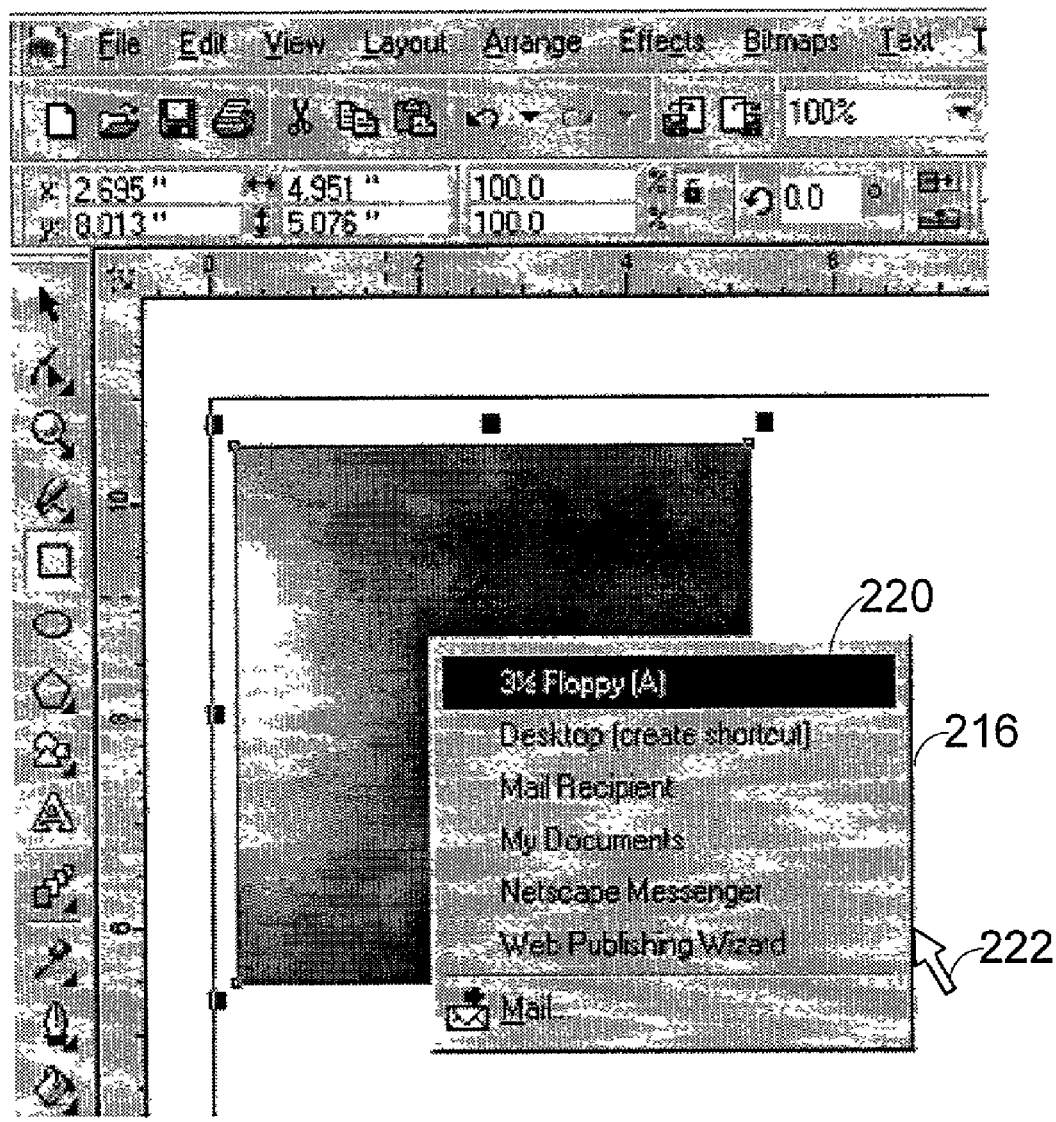
FIG. 7 is a partial screen shot showing a popup window having the "Send To" menu item.

In accordance with an embodiment of the present invention, the "Send To" popup menu item 214 in the "File" menu 212 may be assigned with the shortcut key Alt-S. As shown in FIG. 7, when the shortcut key Alt-S is pressed, a new instance of the "Send To" submenu 216 appears at or adjacent the cursor location 222. The keyboard focus 220 is set on the first option in the submenu 216, and the user can use the keyboard to select a desired option through it. The shortcut key Alt-S may be indicated in the "Send To" item 214 in the "File" menu 212 as shown in FIG. 6 in order to notify the user of the availability of this shortcut key.

As seen in FIGS. 6 and 7, the shortcut key assignment according to the embodiment of the present invention, e.g., Alt-S of FIG. 7, differs from the standard menu accelerators, e.g., Alt-F or "d" of FIG. 6. The menu accelerators links special keystrokes with instances of commands. By contrast, the shortcut key assignment links special keystrokes with the item type and not with a particular instance of the item.

The shortcut key manager of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention. For example, the elements of the shortcut key manager are described separatory, however, two or more elements may be provided as a single element, or one or more elements may be shared with other component in other shortcut key managing system in the application or in the computer system.

What is claimed is:

1. A shortcut key manager for managing shortcut key assignment, the shortcut key manager comprising:
    an item receiver for receiving an item identification that identifies a non-command user interface item type;
    a key receiver for receiving a key identification that identifies a shortcut key;
    an assignment handler for assigning the shortcut key to the non-command user interface item type; and
    a shortcut key handler for presenting an instance of the non-command user interface item to a user when the user uses the shortcut key;
    wherein the shortcut key handler has an item window controller for controlling display of a window with an instance of the non-command user interface item.

2. The shortcut key manager as claimed in claim 1 wherein the shortcut key handler has a focus setter for setting a user control focus to the non-command user interface item.

3. The shortcut key manager as claimed in claim 2 wherein the focus setter sets a keyboard focus to the non-command user interface item.

4. The shortcut key manager as claimed in claim 1 wherein the item window controller has a window display unit for displaying the window at a current cursor location.

5. The shortcut key manager as claimed in claim 1 wherein the item window controller has a window closing unit for closing the window in response to a user input.

6. The shortcut key manager as claimed in claim 1 wherein the shortcut key comprises one or more key strokes.

7. The shortcut key manager as claimed in claim 1 wherein the non-command item is not visual when it is not selected.

8. A method for managing shortcut key assignment, the method comprising steps of:
    receiving an item identification that identifies a non-command user interface item type;
    receiving a key identification that identifies a shortcut key;
    assigning the shortcut key to the non-command user interface item type;
    receiving user input of the shortcut key; and
    presenting an instance of the non-command user interface item to the user in response to the user input of the shortcut key;
    wherein the presenting step comprises a step of controlling display of a window with an instance of the non-command user interface item.

9. The method as claimed in claim 8 further comprising a step of setting a user control focus to the non-command user interface item.

10. The method as claimed in claim 9 wherein the focus setting step sets a keyboard focus to the non-command user interface item.

11. The method as claimed in claim 8 wherein the display controlling step displays the window at a current cursor location.

12. The method as claimed in claim 8 wherein the display controlling step closes the window in response to a user input.

13. The method as claimed in claim 8 wherein the user input receiving step receives one or more key strokes as the shortcut key.

14. The method as claimed in claim 8 wherein the presenting step comprises a step of controlling display of a small pop-up window to display the instance of the non-command user interface item at a current mouse cursor location when the user uses the shortcut key assigned to the non-command user interface item, and the focus setting step sets a keyboard focus to the non-command user interface item displayed in the pop-up window.

15. The method as claimed in claim 14 wherein the display controlling step displays the pop-up window which is free of command user interface items or non-command items other than the instance of the non-command user interface item to which the shortcut key is assigned.

16. A computer readable memory for storing the instructions and/or statements for use in the execution in a computer of a method for managing shortcut key assignment, the method comprising steps of:
    receiving an item identification that identifies a non-command user interface item type;
    receiving a key identification that identifies a shortcut key;
    assigning the shortcut key to the non-command user interface item type;
    receiving user input of the shortcut key; and
    presenting an instance of the non-command user interface item to the user in response to the user input of the shortcut key;
    wherein the presenting step comprises a step of controlling display of a window with an instance of the non-command user interface item.

17. A shortcut key manager for managing shortcut key assignment, the shortcut key manager comprising:
    an item receiver for receiving an item identification that identifies a non-command user interface item type;

a key receiver for receiving a key identification that identifies a shortcut key;

an assignment handler for assigning the shortcut key to the non-command user interface item type; and a shortcut key handler for presenting an instance of the non-command user interface item to a user when the user uses the shortcut key;

wherein the shortcut key handler has an item window controller for controlling display of a small pop-up window to display the instance of the non-command user interface item at a current mouse cursor location when the user uses the shortcut key assigned to the non-command user interface item, and the focus setter sets a keyboard focus to the non-command user interface item displayed in the pop-up window.

18. The shortcut key manager as claimed in claim 17 wherein the item window controller displays the pop-up window which is free of command user interface items or non-command items other than the instance of the non-command user interface item to which the shortcut key is assigned.

* * * * *